O. P. TEEPLE.
TRAY AND SHUCK ASSEMBLING MECHANISM FOR BOX MACHINES.
APPLICATION FILED DEC. 2, 1916.
1,277,154.
Patented Aug. 27, 1918.
5 SHEETS—SHEET 3.
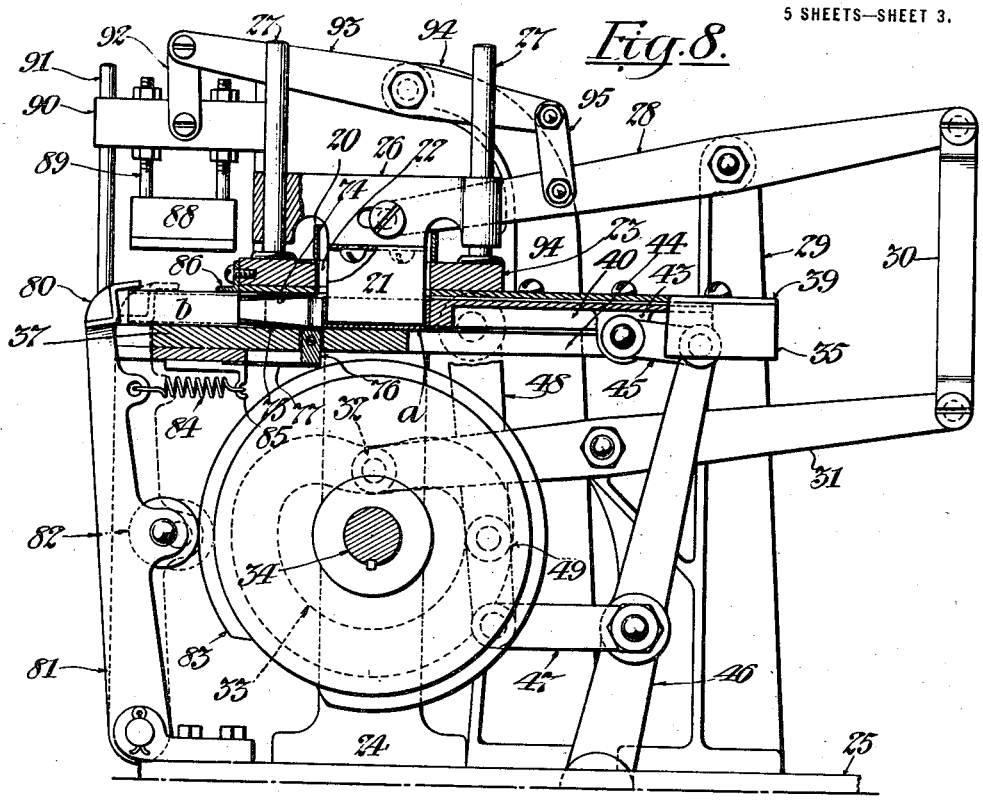
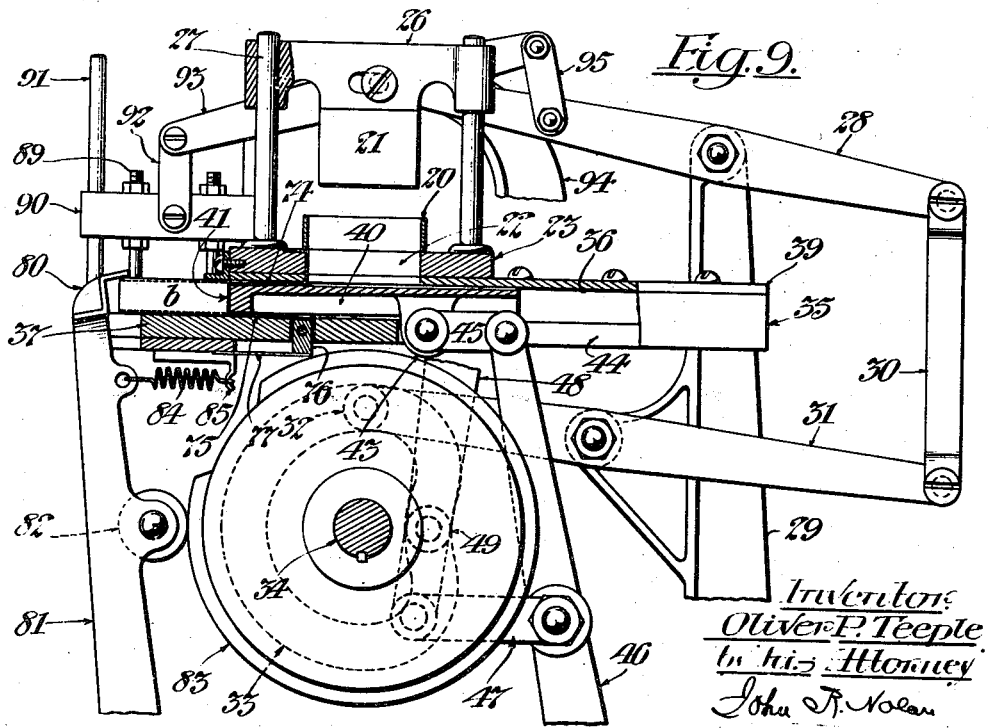

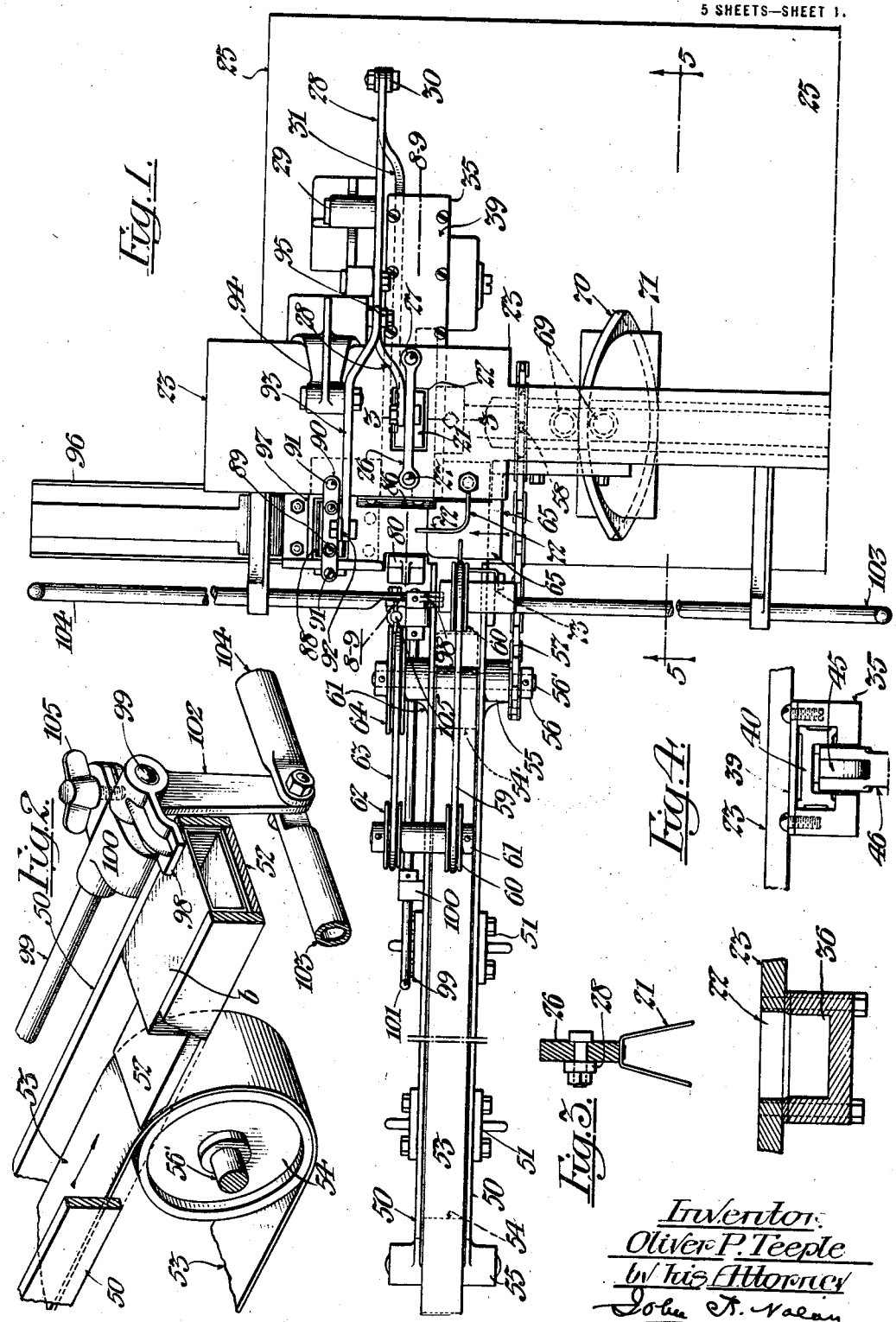

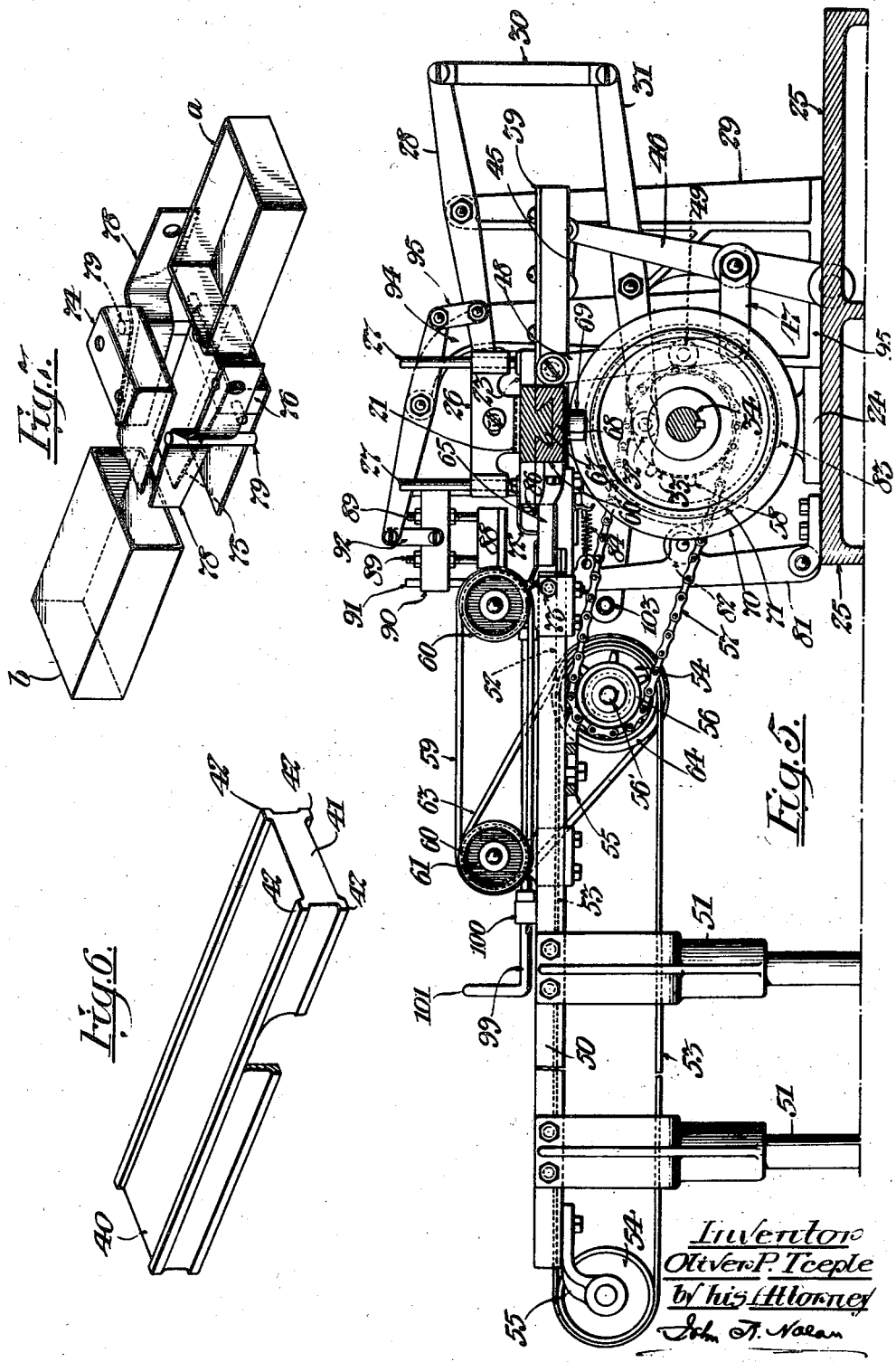

O. P. TEEPLE.
TRAY AND SHUCK ASSEMBLING MECHANISM FOR BOX MACHINES.
APPLICATION FILED DEC. 2, 1916.
1,277,154.
Patented Aug. 27, 1918.
5 SHEETS—SHEET 4.
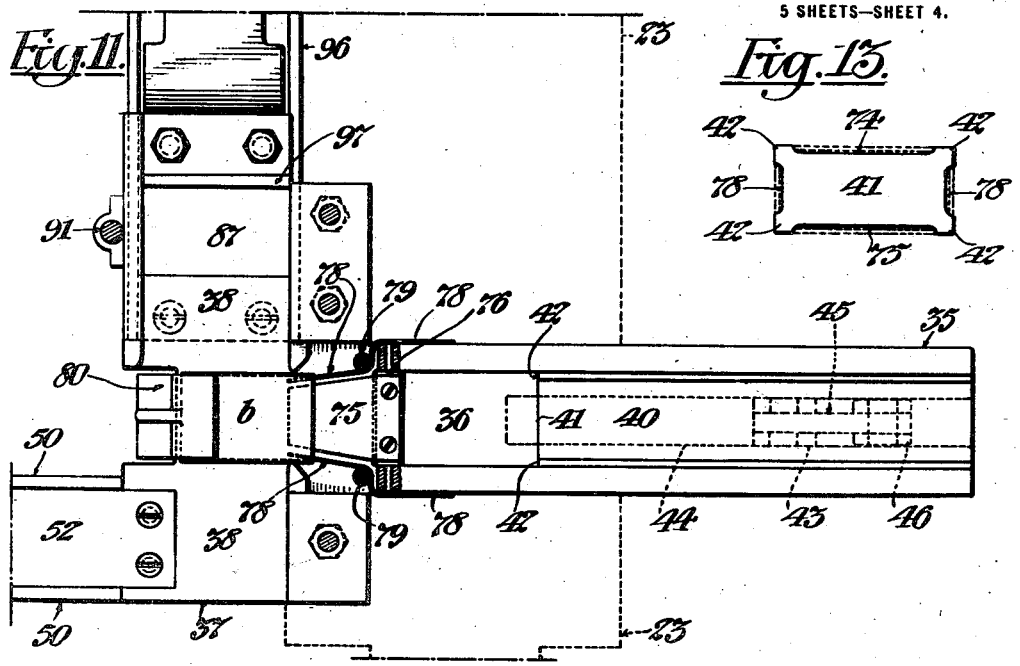
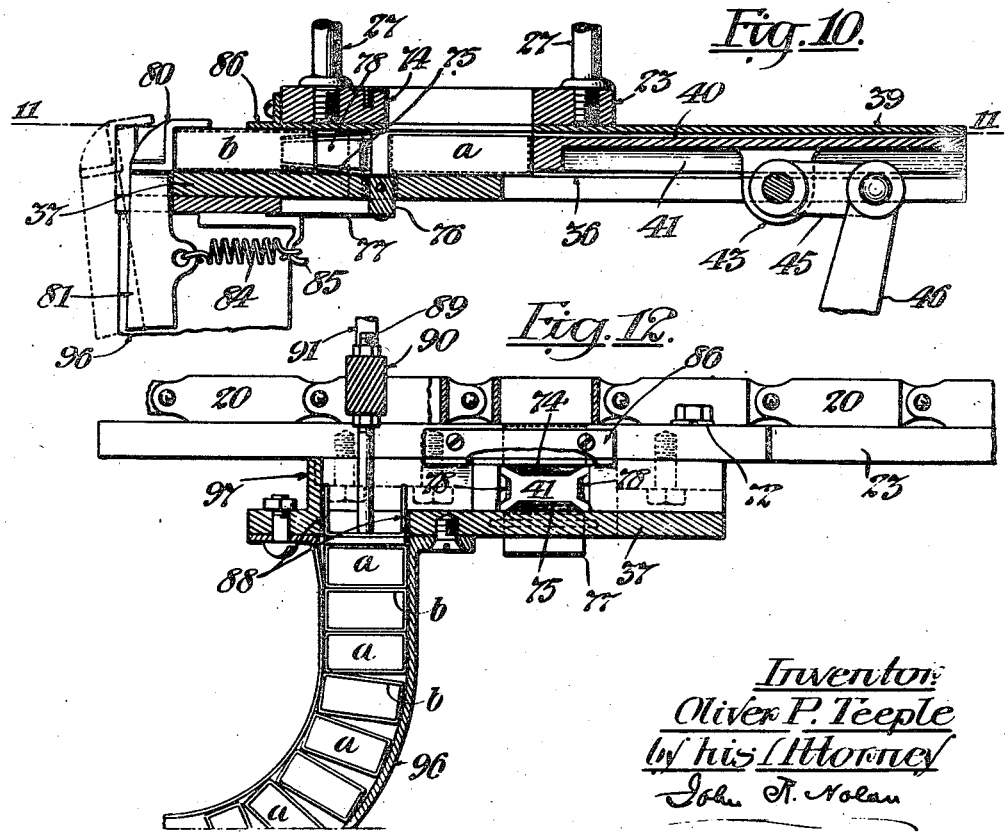
Inventor
Oliver P. Teeple
by his Attorney
John R. Nolan

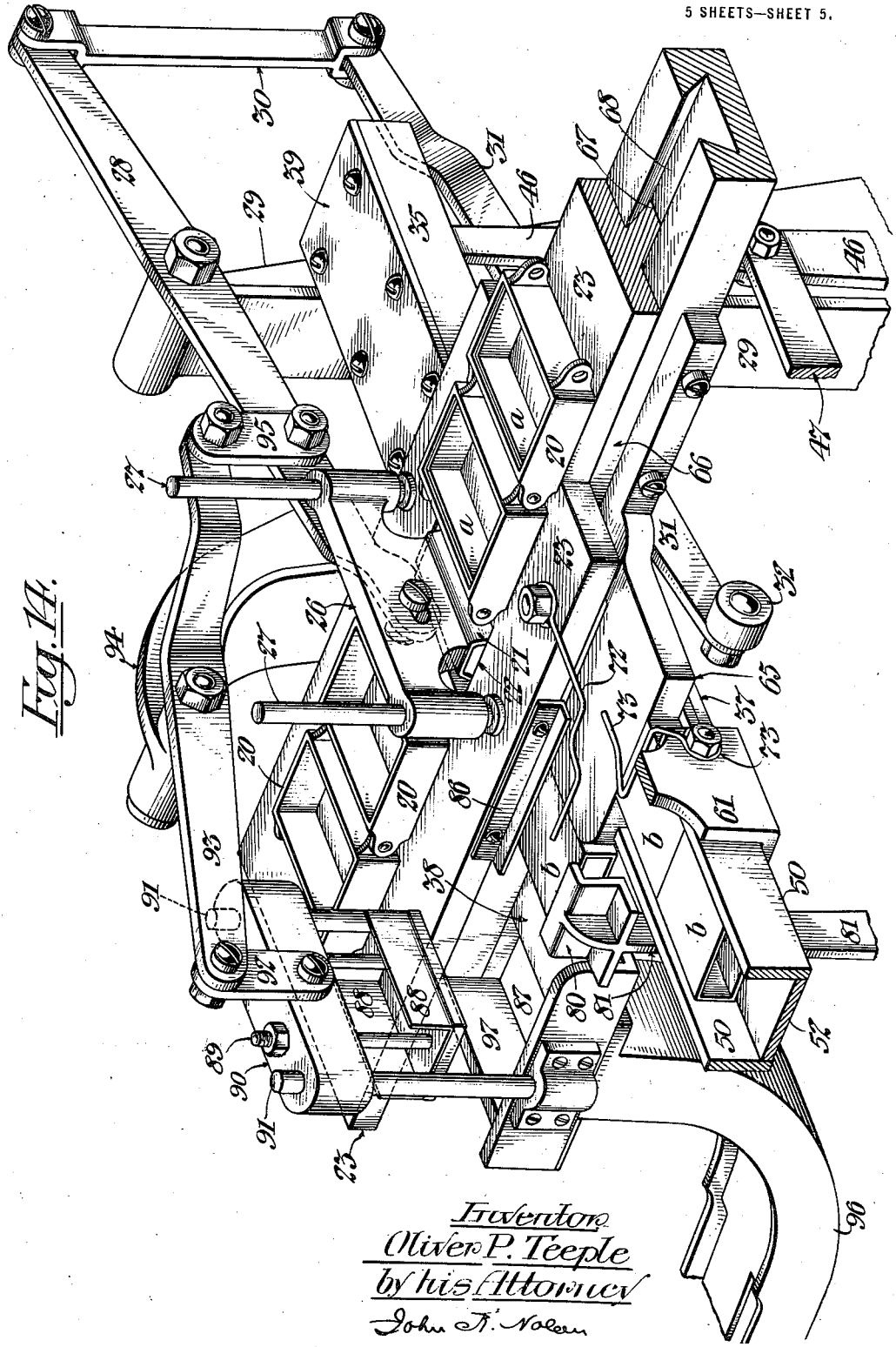

UNITED STATES PATENT OFFICE.

OLIVER P. TEEPLE, OF BARBERTON, OHIO, ASSIGNOR TO THE DIAMOND MATCH COMPANY, OF CHICAGO, ILLINOIS, A CORPORATION OF ILLINOIS.

TRAY AND SHUCK ASSEMBLING MECHANISM FOR BOX-MACHINES.

1,277,154.      Specification of Letters Patent.     Patented Aug. 27, 1918.

Application filed December 2, 1916. Serial No. 134,643.

*To all whom it may concern:*

Be it known that I, OLIVER P. TEEPLE, a citizen of the United States, and resident of Barberton, in the county of Summit and State of Ohio, have invented certain new and useful Improvements in Tray and Shuck Assembling Mechanisms for Box-Machines, of which the following is a specification.

This invention relates to machines for assembling the inner and outer members of slide boxes, and more especially the complementary trays and shucks of match boxes. Such trays and shucks are thus assembled or "nested" in order to facilitate the filling and closing of the boxes on certain types of match packing machines, for example, as illustrated in Letters Patent of the United States No. 836,730, dated November 27th, 1906.

My invention has been especially, though not exclusively, designed for use in connection with or as an attachment to machines for making match box trays, whereby the said trays as rapidly as they are produced by and discharged from the machine are intercepted and associated with the complementary shucks or covers.

The invention, generally stated, consists in the combination with tray feeding and discharging mechanisms, of shuck feeding mechanism associated therewith, means whereby the shucks are successively received and positioned in alinement with the successively discharged trays, and means whereby the said trays are successively entered into their complementary shucks.

The invention also comprises various features of construction and combinations of parts which will be hereinafter described and claimed.

In the annexed drawings—

Figure 1 is a plan of tray-and-shuck assembling mechanisms embodying the preferred form of my invention, the endless tray-chain of the tray-making machine being omitted.

Fig. 2 is a perspective view, partly in section, of a portion of the shuck-feeding trough and adjuncts, including the shuck-brake and its connections.

Fig. 3 is a sectional detail through the bed of the tray-making machine, as on the line 3—3 of Fig. 1, showing the underlying tray channel and the vertical ejector for transferring the successive trays from the chain to said channel.

Fig. 4 is a partial view of the outer (or right-hand) end of the tray channel, showing the tray-plunger and adjuncts.

Fig. 5 is a sectional elevation of the assembling mechanism, as on the line 5—5 of Fig. 1.

Fig. 6 is a perspective view of the tray-plunger, detached, one of its sides being represented as partly broken away.

Fig. 7 is a skeleton perspective view of the spring guide throat for the box members, a complementary tray and shuck being indicated.

Fig. 8 is a transverse vertical section through the tray and shuck channels, as on the line 8—8 of Fig. 1, showing the vertical tray-ejector in down or discharging position and the tray-plunger as retracted; a tray and a shuck being positioned in their respective channels in endwise alinement with each other preparatory to the actions of the shuck-shifting element and the tray-plunger during the assembling operation. In this view the shuck-shifting element is indicated in dotted lines in its inward position.

Fig. 9 is a similar view showing the vertical tray-ejector in elevated position and the tray-plunger at the limit of its forward stroke upon completion of the assembling operation.

Fig. 10 is a similar view through the shuck and tray channels, showing the said shuck-shifting element in its inward position and the shuck thereby positioned upon the throat structure preparatory to the assembling action of the tray-plunger on a tray within the tray channel.

Fig. 11 is a horizontal section as on the line 11—11 of Fig. 10.

Fig. 12 is a vertical section through the shuck channel and the box-discharge chute, showing the throat structure, and also a portion of the tray chain with two of its links in section.

Fig. 13 is an elevation of the acting end of the tray-plunger, showing its relation to the respective spring members of the throat structure and particularly the action of its corners upon an assembled tray and shuck.

Fig. 14 is a sectional perspective view showing various parts of the tray-making and assembling mechanisms in coöperative relation; one of the links of the tray-chain being omitted to show more clearly the vertical tray ejector.

Referring to the drawings, 20 designates several of the open former links of the endless tray chain of a well-known type of box-tray making machine, which links are intermittently impelled in the usual manner to the path of a vertically-reciprocating ejector 21, whereby in each dwell of the chain a tray (a) is discharged from one of the links into an opening 22 in a table 23 which is supported by standards 24 on the main frame 25.

The form of ejector illustrated comprises a yielding bifurcated structure carried by a vertically-reciprocative cross-head 26 which is mounted on vertical guide posts 27 rising from the table 23. This cross-head has a pin and slot connection with one arm of a rock-lever 28 which is fulcrumed on a standard 29 on the main frame. The other arm of the lever is connected by means of a link 30 with one arm of a lower rock-lever 31 which is also fulcrumed on the standard 29; the other arm of lever 31 bearing a roller 32 which enters the run of a suitably-disposed face cam 33. This cam is fast on a drive shaft 34 having its bearings in the standards 24 on the main frame, whereby during the operation of said shaft the cam in its rotation effects, through the described lever and link connections, the timely reciprocation of the ejector in respect to each succeeding link of the box chain.

My invention in its broad aspect contemplates the employment of any suitable or approved mechanism for feeding rows of trays in a horizontal path and depressing the trays successively below said path, and is therefore not limited to the specific organization above described.

Underlying the table 23, and conveniently bolted thereto, is a structure comprising a horizontal bed 35 having formed therein a guide channel 36 which extends directly beneath the opening 22 and at right angles to the path of the adjacent run of the tray chain. This channel corresponds substantially in width and depth with a box-tray and is positioned to receive each tray as it is delivered through the opening of the table.

The bed 35 is provided with a horizontal extension 37 in which is formed at the front of the table a channel 38 at right angles to and in the same horizontal plane as the tray channel, the latter channel communicating with the channel 36 through a skeleton throat structure which will be hereinafter described. The channel 38 constitutes a shuck-channel to which the shucks (b) are successively delivered from a suitable source of supply; the individual shucks then being accurately positioned in alinement with the tray channel preparatory to the assembling operation as will presently appear.

Slidingly mounted in the tray-channel (which is provided with a cap plate 39) is a plunger 40 which is adapted to impinge against and thrust forward to the shuck channel each box-tray that is entered in the tray-channel by the ejector. The plunger comprises an elongated body provided with a tray-engaging end 41 and preferably hollowed on its underside for lightness; the top, bottom and sides of the body being longitudinally channeled (as clearly shown in Fig. 6) to afford clearance for the members of the skeleton throat structure as the plunger enters the latter, and also to provide corner portions 42, whose function will be hereinafter explained.

The body of the plunger is provided on its underside with a lug 43 which depends through a slot 44 in the floor of the tray channel and is connected by means of a link 45 with an upright lever 46 fulcrumed at its lower end on the main frame. This lever is connected by means of a link 47 with the lower end of a depending lever 48 which is fulcrumed at its upper end on one side of the trough. On the lever 48 is a lateral roller 49 which enters the run of the cam 33 previously referred to, whereby the plunger is reciprocated in timely relation to the travel of the ejector. (See Figs. 5, 8 and 9.)

Extending outwardly from the bed extension 37, laterally of and parallel to the path of the tray plunger, is a trough through which the shucks, end to end, are fed toward the shuck channel in the extension. This trough comprises two spaced parallel side rails 50 supported in the present instance by the bifurcated upper portions of standards 51. That end of the trough adjacent the bed extension is provided with a bottom portion 52 having a projecting end which is let into a recess in the floor of the shuck channel and secured thereto so as to lie flush with and constitute, in effect, an angular continuation of the channel. The upper run of a feed belt 53 extends longitudinally of and between the side rails of the trough, running from the outer end of the trough to the bottom section 52 thereof. This belt is supported and guided by suitably-disposed pulleys 54, the shafts of which have their bearings in brackets 55 on the side rails of the trough.

The shaft 56' of the inner pulley bears a sprocket wheel 56 which is geared by means of a chain 57 with a similar wheel 58 on the main shaft 34, whereby the belt is continuously driven, and box shucks imposed on the upper run of the belt are advanced end to end toward the shuck channel in the bed extension. Overhanging the longitudinal path of the train of progressing shucks is an endless belt 59 which is supported and guided by spaced pulleys 60, the shafts whereof are supported in brackets 61 affixed to the sides of the trough. The lower run of the belt 59 travels parallel with and in the same direction as the upper run of the underlying feed belt, and is positioned to contact with the series of progressing shucks and thus co-act with the feed belt to deliver the shucks to the shuck channel in the bed extension. One of the shafts extends laterally beyond the trough and bears a pulley 62 which is connected by means of a belt 63 with a pulley 64 on the driven shaft 56'. Thus the feed belts 53, 59 are concurrently driven.

As each shuck of the row is delivered to the shuck channel of the bed extension such shuck is shifted along said channel into alinement with the tray channel 36, and is thus in position to receive a complementary box tray from the latter. The preferred means for thus positioning the shuck comprises a plunger member 65 reciprocative within and longitudinally of the shuck channel. This plunger is secured to a bar 66 which is slidingly mounted, as by means of a dovetail tongue 67 and groove 68, to the underside of the table 23. The bar is provided with a pair of depending rollers 69 between which extends the peripheral cam rib 70 of a cam 71 fast on the main shaft; the contour of the cam rib being such as to effect the timely reciprocation of the slide bar 66 and plunger 65 in order to position the shuck for the reception of its complementary box tray from the tray channel, as above mentioned.

The outer edge of the shuck plunger travels in close relation to the inner end of the feed trough, so as to serve as a temporary stop for the series of advancing shucks in the trough while a shuck is being positioned within the shuck channel and being supplied with a tray from the tray channel. While the forward end of the row of shucks in the trough is thus arrested the belts 53, 59 merely travel in frictional contact with the tops and bottoms respectively of the interposed shucks.

A simple and efficient means to prevent upward movement or displacement of the shucks as they are being delivered to, and also as they are being advanced along, the shuck channel, comprises two suitable springs 72, 73 arranged to overhang the said channel and bear yieldingly upon the successive shucks therein. In the present instance the spring 72 is secured to the table and the other 73 is secured to one side of the feed trough.

The inner wall of the shuck channel 38 serves as a stop for the leading shuck when it is delivered from the trough to the channel. The opening in this wall affording communication between the shuck and tray channels is appropriately recessed for the reception of the skeleton throat structure above referred to. This structure comprises a series of four spring walls which slightly converge through the recessed opening, from the sides, top and bottom of the tray channel, the free ends of such walls being flush, or substantially so, with the inner wall of the shuck channel. The throat walls are preferably composed of flat strips of spring steel of appropriate shape. The top spring 74 is suitably bent at its inner end and conveniently secured to the table 23 as shown. The bottom spring 75 is secured to a block 76 which is pivotally mounted in an aperture in the floor of the tray channel, such block with its spring member being held normally in raised position by means of a light spring 77 which is secured to the block and to a stationary part of the machine. The side springs 78 are secured to the sides of the tray channel, and are appropriately shaped for lateral contact with and support by rigid pins 79 rising from the bed, as seen in Figs. 7 and 13.

By the construction just described the spring members of the throat structure can be readily assembled, and can be as readily removed and replaced for renewal or repair as occasion may require. The particular mounting of the bottom spring member insures an increased tensioning thereof without adding to the thickness of the spring metal; it being understood that the spring members are made just as light and as thin as is consistent with strength and efficiency.

The outer wall and the adjacent part of the bottom of the shuck channel 38 are cut away directly in front of the throat structure to accommodate a pressure member which has limited movement toward and from such structure. In the present instance this member comprises an angular head-piece 80 formed on the upper or free end of an upstanding lever 81 which is fulcrumed at its lower end on a bracket on the main frame. This lever bears a suitably-disposed roller 82 which acts against a peripheral cam 83 on the main shaft, the roller being held in operative contact with the cam by means of a spring 84 which is secured to the lever and to a bracket 85 on a stationary part of the machine. The contour of the cam is such that when a shuck is positioned in front of the throat structure, the lever 81 is pulled inward by the action of the spring 84, the head piece thus impinging against the opposing end of the shuck and bodily pushing it until the inner end of the shuck snugly embraces the free ends of the spring members of the throat structure, such members yieldingly grasping and supporting the shuck as illustrated in Figs. 10 and 11. Thereupon the head-piece is retracted by the action of the cam on the roller of the lever; and while the head-piece is thus retracted the tray-plunger is actuated so as to push a tray bodily from the tray-channel into and through the throat structure, the latter thus effectually guiding such tray into the complementary shuck which is supported by the contracted end of the structure. The active stroke of the tray plunger is not only sufficient to insert the tray entirely into the shuck presented thereto, but also to push the assembled tray and shuck outwardly beyond the free ends of the throat springs (which frictionally hold the shuck) into a position where the box is advanced along the shuck channel by the movement of the next succeeding shuck to the tray-receiving station.

As above mentioned the tray-plunger is appropriately shaped to afford clearance for the walls of the throat as the plunger enters the latter. The corners 42 at the acting end of this plunger enter the corner spaces of the throat walls, and, when the tray is fully entered in the shuck, such corners 42 impinge directly against the opposing corners of the associated tray and shuck and force the box from the grasp of the throat springs, as above mentioned.

A guide bar 86 is conveniently affixed to the edge of the table so as to overhang the shuck channel in the region of the assembling station, and thus prevent vertical displacement of the shucks during the entry of the trays therein.

The assembled box members as they progress along the shuck channel pass successively to an opening 87 in the floor of the channel, and are discharged therethrough by a vertically-reciprocating plunger head 88 working in the opening. This head is supported by rods 89 depending from a cross-head 90 on suitably-disposed guide rods 91, said cross-head being connected by means of a link 92 to one arm of a rock-lever 93 which is fulcrumed on a standard 94 rising from the main frame; the other arm being connected by a link 95 with the rock-lever 28, whereby the head is caused to reciprocate concertedly with the tray ejector.

The discharge opening 87 communicates with an underlying chute 96 which is affixed to the underside of the bed extension. This chute receives the assembled box members in successive order and directs them to a suitable position for removal.

A wall 97 located on the bed-extension at the back of the discharge opening affords a suitable stop for the assembled box members when they are positioned above the opening.

As a simple and efficient means whereby the feeding of the shucks from the trough to the path of the plunger 65 can be promptly checked at the will of the operator, I provide a brake which may be caused to bear down upon the leading shuck in the trough. This brake, in the form illustrated, comprises a shoe 98 fast on one end of a rock shaft 99 having its bearings in brackets 100 on one side of the trough. The other end of the shaft is extended to a suitable point and is provided with a handle 101 whereby the shaft can be manually turned to cause the brake shoe to act upon the underlying shuck. That end of the shaft to which the brake shoe is attached is provided with a depending arm 102 to which are pivoted two rods 103, 104 extending in opposite directions from the brake shoe. These rods are guided in suitable supports and are provided with appropriate handle portions whereby they can be grasped and operated. By this construction the brake may be operated from three widely separated points by actuation of the respective rods (i. e. by pushing the rod 103 or pulling the rod 104, or by partially turning the rod 99) in order to act upon the leading shuck in the trough.

One of the bearing brackets 100 is preferably split and provided with a connecting screw 105 by manipulation of which sufficient friction may be imposed on the rock-shaft 99 to maintain the brake shoe and its connections normally in raised or idle position.

The mechanisms herein shown and described to exemplify my invention coöperate effectually with the tray making machine to assemble the trays in their complementary shucks as rapidly as the trays are discharged from the tray making machine. It is to be understood, however, that my invention is not limited to the specific details and structural features disclosed as the mechanisms may be variously modified within the principle of my invention and the scope of the appended claims.

I claim—

1. In a machine of the character described, the combination of means for feeding a series of trays in a horizontal path; a tray-and-shuck support parallel with and in a lower plane than said path; a tray support underlying said path at right angles thereto and opening into one side of the said tray-and-shuck support; means for moving the successive trays of the series down upon the underlying tray support; means for moving said trays endwise along the tray support to the tray-and-shuck support; means for delivering shucks to the tray-and-shuck support in advance of the junction therewith of the tray support, and means for moving said shucks along the tray-and-shuck support and into endwise alinement with the tray support.

2. In a machine of the character described, the combination of means for feeding a series of trays in a horizontal path; a tray-and-shuck support parallel with and in a lower plane than said path; a tray support underlying said path at right angles thereto and opening into one side of the said tray-and-shuck support: means for moving the successive trays of the series down upon the underlying tray support; means for moving said trays endwise along the tray support to the tray-and-shuck support; means for delivering shucks to the tray and shuck support in advance of the junction therewith of the tray support; means for moving said shucks along the tray-and-shuck support and into endwise alinement with the tray support, and a yielding tapering guide throat at the junction of the supports converging from the tray-support to the tray-and-shuck support.

3. In a machine of the character described, the combination of means for feeding a series of trays in a horizontal path; a tray-and-shuck support parallel with and in a lower plane than said path; a tray support underlying said path at right angles thereto and opening into one side of the said tray-and-shuck support; means for moving the successive trays of the series down upon the underlying tray support; means for moving said trays endwise along the tray support to the tray-and-shuck support; means for delivering shucks to the tray-and-shuck support in advance of the junction therewith of the tray support; and means for moving said shucks along the tray-and-shuck support and into endwise alinement with the tray support; a yielding tapering guide throat at the junction of the supports converging from the tray-support to the shuck-and-tray support, and means for pushing each positioned shuck upon the adjacent narrow end of the guide throat.

4. In a machine of the character described, the combination of means for feeding a series of trays in a horizontal path; a tray-and-shuck support parallel with and in a lower plane than said path; a tray support underlying said path at right angles thereto and opening into one side of the said tray-and-shuck support; means for moving the successive trays of the series down upon the underlying tray support; means for moving said trays endwise along the tray support to the tray-and-shuck support; means for delivering shucks to the tray-and-shuck support in advance of the junction therewith of the tray support; means for moving said shucks along the tray-and-shuck support and into endwise alinement with the tray support; a yielding tapering guide throat at the junction of the supports converging from the tray-support to the tray-and-shuck support, and a reciprocative member for acting upon each positioned shuck and pushing it partly upon the adjacent end of the guide throat.

5. In a machine of the character described, the combination of means for feeding a series of trays in a horizontal path; a tray-and-shuck support parallel with and in a lower plane than said path; a tray support underlying said path at right angles thereto and opening into the tray-and-shuck support; means for imposing the successive trays of the series upon the underlying tray support; means for moving the successive trays endwise along the tray support to the tray-and-shuck support; means for feeding a series of shucks at right angles to the path of the series of trays and depositing said shucks successively upon the tray-and-shuck support in advance of the junction therewith of the tray support, and means for feeding the successive shucks along the tray-and-shuck support and positioning them in endwise alinement with the tray support.

6. In combination with tray-discharging mechanism, a support adjacent thereto including communicating tray and shuck channels extending at right angles to each other and having their respective floors on substantially the same horizontal plane, the tray channel being positioned directly beneath said mechanism so as to receive the successive trays discharged thereby, means for successively feeding shucks to the shuck channel, means for moving each succeeding shuck along its channel to a position in endwise alinement with the tray channel, and means for moving each tray along the latter channel and inserting it into the complementary alining shuck in the shuck channel.

7. The combination with tray discharging mechanism including channels extending at right angles to each other and having their respective floors on substantially the same horizontal plane, one of said channels being positioned directly beneath said mechanism so as to receive the successive trays discharged thereby, of a tapering guide throat affording communication between said channels, said throat comprising a series of spaced spring members, means for supporting the larger portion of said throat adjacent the tray support, means for imposing a shuck upon the narrow portion of said throat, and means for moving a tray longitudinally through the throat and into the said shuck and then pushing the assembled tray and shuck beyond the spring members of the throat.

8. The combination with tray discharging mechanism including channels extending at right angles to each other and having their respective floors on substantially the same horizontal plane, one of said channels being positioned directly beneath said mechanism so as to receive the successive trays discharged thereby, of a tapering guide throat affording communication between said channels, said throat comprising a series of spaced spring members, means for supporting the larger portion of said throat adjacent the tray support, means for imposing a shuck upon the narrow portion of said throat, and means for moving a tray longitudinally through the throat and into the said shuck and then pushing the assembled tray and shuck beyond the spring members, said last-named means including a plunger having corner portions which enter the open corner spaces of the throat.

9. The combination with tray discharging mechanism including channels extending at right angles to each other and having their respective floors on substantially the same horizontal plane, one of said channels being positioned directly beneath said mechanism so as to receive the successive trays discharged thereby, of a guide throat affording communication between said channels, said throat comprising a top member, a bottom member and side members, and means for supporting those ends of the members adjacent the interior of the tray support, said means including spaced vertical pieces which embrace the side members, means for positioning a shuck at the free ends of the spring members, and means for longitudinally moving a tray through the throat and into the shuck thus positioned.

Signed at Barberton, in the county of Summit and State of Ohio, this 28th day of November, A. D. 1916.

OLIVER P. TEEPLE.